United States Patent [19]

Fuwa et al.

[11] 3,928,525
[45] Dec. 23, 1975

[54] METHOD FOR FORMING AND VULCANIZING VULCANIZABLE MATERIALS

[75] Inventors: Masaru Fuwa; Kiyoshi Takahashi, both of Ami; Masaaki Otsuji, Nishinomiya; Masatake Matsui, Takatsuki, all of Japan

[73] Assignees: Mitsubishi Petrochemical Co., Ltd.; Dainichi-Nippon Cables, Ltd., Japan

[22] Filed: Nov. 19, 1973

[21] Appl. No.: 416,847

Related U.S. Application Data

[63] Continuation of Ser. No. 212,049, Dec. 27, 1971, abandoned.

[30] Foreign Application Priority Data

Dec. 29, 1970 Japan................................ 45-127273
June 26, 1971 Japan................................ 46-46660

[52] U.S. Cl. ................. 264/174; 264/211; 264/237
[51] Int. Cl.² .......................................... B29F 3/10
[58] Field of Search ........... 264/211, 174, 338, 347, 264/237, 348

[56] References Cited
UNITED STATES PATENTS

| 2,317,687 | 4/1943 | Larchar | 264/209 |
|---|---|---|---|
| 2,581,231 | 1/1952 | Berggren | 264/347 |
| 2,972,780 | 2/1961 | Boonstra | 264/26 |
| 3,054,142 | 9/1962 | Hinderer et al. | 264/174 |
| 3,284,248 | 11/1966 | Rumberger | 264/338 |
| 3,492,310 | 1/1970 | Carrow | 264/211 |
| 3,504,081 | 3/1970 | Aron | 264/338 |

*Primary Examiner*—Robert F. White
*Assistant Examiner*—Gene Auville
*Attorney, Agent, or Firm*—Armstrong, Nikaido & Wegner

[57] ABSTRACT

An improvement is provided in the forming and vulcanizing of organic peroxide vulcanizable polymers in a long-land die by the use of a special class of forming coagents characterized by a. a viscosity of at least 0.5 centi-stokes and at most 3,000 centi-stokes at 235°C.,
b. an absorption ratio to the said polymer at 150°C. for 45 hours less than 100 mg./cm²,
c. not being gelled even in contact with said organic peroxide in the course of vulcanization, and
d. not being boiled in the course of vulcanization.

Electrical cable having a vulcanized insulation layer made according to the present invention is characterized by an excellent continuous surface layer free of voids and bubbles.

13 Claims, 2 Drawing Figures

INVENTOR
MASARU FUWA
MASAAKI OTSUJI
KIYOSHI TAKAHASHI
MASATAKE MATSUI

BY

ATTORNEY

METHOD FOR FORMING AND VULCANIZING VULCANIZABLE MATERIALS

This is a continuation of application Ser. No. 212,049, filed Dec. 27, 1971, now abandoned.

BACKGROUND OF THE INVENTION

The present invention relates to a novel method for forming and vulcanizing rubbers or synthetic resins mixed with organic peroxide (hereinafter the mixture will be referred to as "vulcanizable material"). More particularly, it provides an excellent method for producing elongated articles from a vulcanizable material by passing the material through a forming and vulcanizing long-land die.

It is common practice to produce elongated articles of vulcanized material by forcing the vulcanizable material through a short-land die (which functions merely for formation of the material) and advancing the resulting extrudate through an extended vulcanizing chamber filled with high-pressure steam.

Heretofore, there has been proposed a method for producing vulcanized elongated articles, such as vulcanized rod, tube or insulating cable having a vulcanized layer, wherein a vulcanizable material, such as polyethylene containing a vulcanizing agent, is extruded and vulcanized by passing through a long-land die heated to the vulcanizing temperature of the material. Hereinafter this method will be referred to as "long-land die vulcanization".

Long-land die vulcanization is expected to have the following advantages in comparison with the conventional steam vulcanization method:

1. The vulcanized product has a precise dimension and longitudinally uniform size because the material is closely confined in the long-land die throughout the forming and vulcanizing stage.
2. The outer surface of the vulcanized product thus obtained is glossy smooth, because during vulcanization the surface of the product is not in contact with any water drops which often impair product surfaces.
3. In the case of the steam vulcanization as the vulcanization temperature is increased, the vulcanization pressure also increases. Therefore, it is difficult to carry out steam vulcanization at a temperature higher than 200°C. because a vulcanizing chamber must be designed to withstand considerably high pressures, at such high temperatures. In contrast, in long-land die vulcanization, vulcanization at a high temperature, for example, 250°C., can be easily carried out because the vulcanization temperature is set independently from the vulcanization pressure. Therefore, vulcanization time can be considerably shortened.
4. The forming and vulcanizing apparatus can be made remarkably small and simple.

Notwithstanding the expected advantages as described above, the long-land die vulcanization has not been used in commercial practice. One of the obstacles that have prevented in industrial use of the long-land die vulcanization is in the difficulty in passing the formed product smoothly through a long-land die.

For eliminating such obstacles, a number of proposals have been made to achieve smooth passing of the formed product through a closed confining passage. The use of a passage whose inner wall has a polished surface-finishing has been suggested. Another proposal was the use of a passage whose inner wall is coated with thin layer of perfluorocarbon resin. Still another idea was admixing a forming coagent such as chlorinated hydrocarbon lubricants, silicone oil, or other lubricating liquids in the vulcanizable compound (U.S. Pat. No. 2,972,780). Still another proposal was supplying a liquid lubricant, such as oil, onto inner surface of the passage (U.S. Pat. No. 3,054,142). The liquid lubricant functions as a releasing agent to prevent scorching and sticking of the formed product to the die surface, and also a lubricant to facilitate the passing of the formed product.

However, it has proven that even if a long-land die having a polished surface-finishing is used, only vulcanized products having rough or cracked surfaces are obtained. It has also been proven that the problem can not be solved by the use of perfluorocarbon resin-coated long-land die, because the coating layer is readily damaged after a short operation period. Also, we have found that when lubricants or forming coagents, which are conventionally used in molding of plastic and rubber, such as silicone oil and other oils, are employed in long-land die vulcanization in a relatively short period of time after the start of the operation, the surface of the vulcanized product became rough or cracked in spite of continuous supplying of the forming coagent to the surface of the product. We have discovered that, unexpectedly, this phenomenon is caused by the loss in lubricating and releasing properties of the forming coagent because of gelation resulting from attack by organic peroxide migrating from the vulcanizable material. The resultant gel sticks on the surface of the formed product or wedge into the formed product resulting in a rough or cracked surface.

The present invention is based on the discovery that the use of a certain class of forming coagents, having specific critical physical properties, makes possible for the first time the continuous commercial operation of the forming and vulcanizing in a long-land die.

SUMMARY OF THE DISCLOSURE

The present invention relates to a method for forming and vulcanizing a vulcanizable material comprising passing a mixture of an organic peroxide vulcanizable polymer and an organic peroxide through a long-land die having a forming zone and a succeeding vulcanizing zone, while simultaneously supplying a forming coagent onto the inner surface of said long-land die, said forming coagent being characterized by a. a viscosity of at least 0.5 centi-stokes and at most 3,000 centi-stokes at 235°C.,
b. an absorption ratio to the said polymer at 150°C. for 45 hours less than 100 mg./cm.$^2$,
c. not being gelled even in contact with said organic peroxide in the course of vulcanization, and
d. not being boiled in the course of vulcanization;

the forming coagent being supplied in such a manner as to maintain a continuous film between the inner surface of said die and the polymer product.

DETAILED DESCRIPTION

Figure 1:
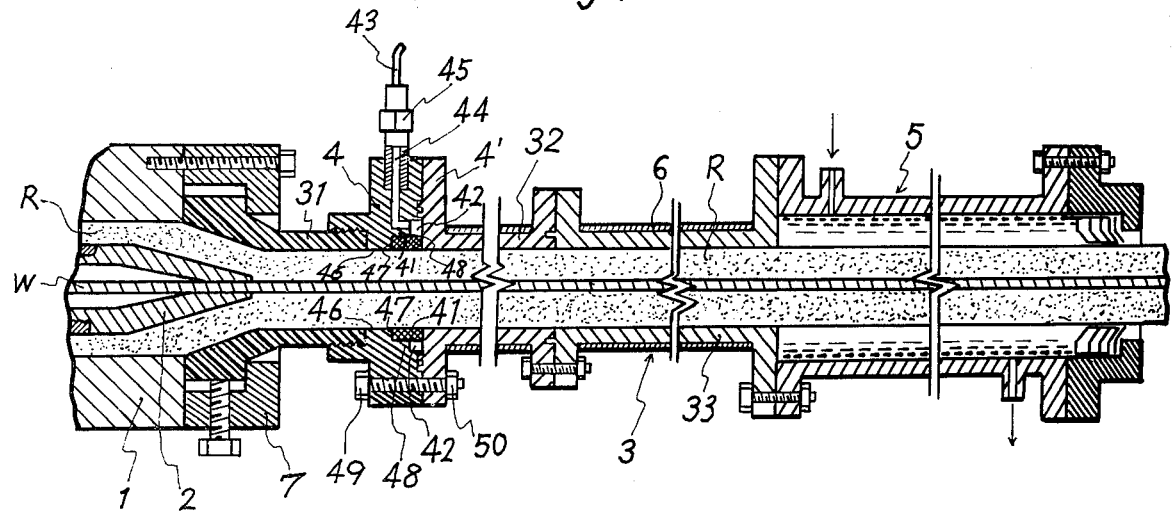
FIG. 1 is a longitudinal section view showing an apparatus for manufacturing an electrical cable having a vulcanized insulation layer.

In practice, the forming coagent functions to separate the inner surface of the long-land die and the forming product which is constantly changing in its chemical and physical properties during its vulcanization by the organic peroxide admixed therewith. The coagent, provided on the inner surface of the long-land die, thus separating the die from the forming product should be spread over the entire interface to form a continuous film. The coagent transferred to the surface of the formed product should not be lacking in any spot as the formed product passes through the die.

The forming coagent to be employed in the present invention must have a viscosity at 235°C. of at least 0.5 centi-stokes, preferably above 1.1 centi-stokes, most favorably above 5 centi-stokes.

If the viscosity of the forming coagent is less than 0.5 centi-stokes, the coagent is apt to flow locally and it is difficult for the coagent to spread uniformly over the entire interface between the inner surface of the long-land die and the surface of the formed product, therefore a continuous film can not easily be formed. A viscosity of 3,000 centi-stokes is a practical upper limit. If the viscosity of the forming coagent is greater than 3,000 centi-stokes, the coagent can not be readily supplied to a long-land die. Further the forming coagent to be employed in the present invention must have an absorption ratio with respect to the vulcanizable material to be employed of less than 100 mg./cm.$^2$, preferably less than 30 mg./cm.$^2$. In the present invention, the above-mentioned absorption ratio is determined according to the following way; a vulcanized sheet (30 mm. × 30 mm. × 1 mm.) made from the vulcanizable material to be employed is immersed in the forming coagent to be used at 150°C. for 45 hours. The sheet is weighed before and after the immersion, and the difference between both weights divided by the total surface area of the sheet before immersion gives the absorption ratio.

If the absorption ratio of the forming coagent is too high, the continuous film of the coagent is also difficult to form and maintain. In general, a uniform thickness distribution of the forming coagent layer can not be expected. Especially when the long-land die is horizontally set, there is a tendency for the forming coagent to flow more selectively in the upper region of the interface. Accordingly, when a coagent with a too high absorptionn ratio is used, in the region where it flows relatively less, the coagent is absorbed into the formed product, which results in partial drying up of the coagent. Such partial drying up is not eliminated even if the feed of the forming coagent is increased, because the additional coagent does not go to the dried up region, but goes predominantly to the region where flow is much easier for the coagent. Furthermore, the excess coagent supplied to the region where flow is easier tends to spoil the surface of the formed product.

The absorption ratio of some forming coagents increases to higher than 100 mg./cm.$^2$ as a result of chemical changes under the forming and vulcanization condition. Such forming coagents can now be used for the present invention even if the original absorption ratio is within the required limits.

Still further the forming coagent to be employed in the present invention must not gel in the course of a continuous operation.

Gelation of the coagent under normal operation conditions is determined according to the following test: a mixture of 10 parts by weight of a forming coagent and 1 part by weight of an organic peroxide in a sealed vessel provided with a mixer is heated at a rate of about 10°C. per minute up to 235°C. and is maintained at that temperature for 5 minutes, then the viscosity ($\eta_1$) of the resultant liquid is measured at 235°C. The original viscosity ($\eta_0$) of the forming coagent itself at 235°C. is also measured. The forming coagent having the ratio $\eta_1/\eta_0$ of lower than 30, is considered not to gel for purposes of the present invention and is expected not to form any gelled film on the inner surface of long-land die in a continuous operation for at least several hours. When the organic peroxide is non-volatile, the heat treatment may be carried out in an open vessel. In the above test it is not always necessary to use the organic peroxide that is actually admixed in the vulcanizable material. Other typical peroxides, for example, dicumyl peroxide, can be used without error in determination.

Still further the forming coagent to be employed in the present invention should not boil under vulcanization conditions.

If the coagent boils, pockmarks caused by bubbling appear on the surface of the vulcanized product. When violent boiling occurs, the lubricating and releasing properties of the coagent are lost and accordingly the surface of vulcanized product becomes rough and, in extreme cases, cranking occurs. However, a coagent which boils slightly may be permitted, because slight boiling does not substantially affect the surface of product. The following classes of compounds are representative and suitable as the forming coagent:

1. polyoxyalkylenes and their derivatives, random, block or graft copolymers of two or more alkylene oxides and their derivatives whose molecular weight is greater than 120 and lower than 100,000,
2. polyhydric alcohols (including their dehydrated products) having from 4 to 50 carbon atoms and their alkyl esters or ethers,
3. fatty acid alcohol amides having more than 8 total carbon atoms, which are made from fatty acids having from 2 to 30 carbon atoms and alcohols having from 1 to 30 carbon atoms,
4. fatty acid amides having from 8 to 90 carbon atoms,
5. fatty acids having from 8 to 30 carbon atoms and their metal salts,
6. esters of polycarboxylic acids having from 6 to 22 carbon atoms and monoalcohols having from 1 to 20 carbon atoms,
7. phosphoric acid esters of alkyl alcohols having from 3 to 30 carbon atoms,
8. polyesters whose molecular weight is greater than 200 and lower than 30,000,
9. metal nitrates and metal halides,
10. compositions of polysilozanes whose molecular weight is greater than 2,000 and lower than 100,000 and gelation inhibitors (the details of which are described later),
11. compositions of polysiloxanes whose molecular weight is greater than 2,000 and lower than 100,000 and an alkali or alkaline earth metal hydroxide or oxide.

The compounds are selected on the basis of their physical, rather than chemical properties, based on their ability to withstand to meet the severe physical requirements described above. Explaining in detail, typical examples of these compounds are:

1. polyoxyalkylenes and their derivatives, random, block or graft copolymers of two or more alkylene oxides and their derivatives whose molecular weight is greater than 120 and lower than 100,000;
    alkyl ether type such as polyethylene glycol lauryl ether, alkyl aryl ether such as polyoxyethylene nonyl phenyl ether, alkyl thioether such as polyethylene glycol stearyl thioether, alkyl ester such as polyoxyethylene tall oil ester, polyoxyethlene resin ester, sorbitan alkyl ester such as polyoxyethlene sorbitan monopalmitate, polyoxyethlene sorbitan tristearate, polyoxyethylene sorbitan monooleate, phosphoric ester such as polyoxyethylene dicresyl phosphate, condensation product with amine such as N,N-di(polyoxyethylene)stearylamine, condensation product with amide such as polyoxyethylene stearylamide, polyoxyethlene nonylbenzene sulfonamide, etc.
2. polyhydric alcohols (including their dehydrated products) having form 4 to 50 carbon atoms and their alkyl esters or ethers;
    polyhydric alcohol such as sorbitan and saccharides, alkyl esters or ethers of polyhydric alcohol (including its dehydrated product) such as dehydrated sorbitan palmitate, ester of polyhydric alcohol and fatty acid such as mono- or di-glyceride of linear fatty acids such as palmitic acid, stearic acid, or resin acid such as rhodinic acid, naphthenic acid, caproic ester of pentaerythritol and alkyl ester of saccharose, myristyl galactose ether, etc.
3. fatty acid alcohol amides having more than 8 total carbon atoms, which are made from fatty acids having from 2 to 30 carbon atoms and alcohols having from 1 to 30 carbon atoms;
    lauryl ethanol amide, stearyl methylol amide, palmityl oxymethyl ethanol amide, etc.
4. fatty acid amide having from 8 to 90 carbon atoms; stearic acid amide, oleic acid amide, etc.
5. fatty acids having from 8 to 30 carbon atoms and their metal salts;
    fatty acid such as stearic acid, oleic acid, palmitic acid, etc;
    metallic salt of fatty acid such as stearic acid, oleic acid, palmitic acid, lauric acid, 12-hydroxystearic acid, and naphthenic acid, and a metal such as Li, Cu, Be, Mg, Ca, Sr, Ba, Zn, Cd, Al, Ce, Ti, Zr, Pb, Cr, Mn, Co, Ni, Fe, Hg, Ag, Tl, Sn, etc.
6. esters of polycarboxylic acids having from 6 to 22 carbon atoms and monocalcohols having from 1 to 20 carbon atoms;
    dibutyl phthalate, di-2-ethylhexyl phthalate, dinonyl phthalate, di-n-octyl phthalate, dibutyl sebacate, di-2-ethylhexyl adipate, tri-n-butyl citrate, tri-2-ethylhexyl trimellitate, tri-n-octyl trimellitate, tetra-2-ethylhexyl pyromellitate, etc.
7. phosphoric acid esters of alkyl alcohols having from 3 to 30 carbon atoms;
    tributyl phosphate, tri-2-ethylhexyl phosphate, etc.
8. polyesters whose molecular weight is greater than 200 and lower then 30,000;
    polyethlene succinate, polypropylene adipate, polyethylene azelate, poly(1,3-butanediol)sebacate, poly(diethylene glycol)adipate, poly(1,6-hexanediol)-adipate, polypropylene phthalate, etc.
9. metal nitrates and metal halides;
    $BiCl_3$, $BiBr_3$, $AgNo_3$, $TlNO_3$, mixture of $NaNO_3$, $KNO_3$ and $Ca(NO_3)_2$, etc.
10. compositions of polysiloxanes whose molecular weight is greater than 2,000 and lower than 100,000 and gelation inhibitors (the details of which are described later);
    a composition of liquid organopolysiloxane such as polydimethylsiloxane, polmethylphenylsiloxane, and an inhibitor. In case polysiloxane alone is employed as a forming coagent, gelation of the polysiloxane occurs for a short period of time during vulcanization. However, polysiloxane can be utilized as a satisfactory forming coagent by incorporating an inhibitor which reacts with organic peroxide preventing the crosslinking of the polysiloxane by the peroxide.
    Examples of such inhibitor are phenols and amines such as $\alpha$-naphthol, $\beta$-naphthol, pyrogallol, catechol, 4,4'-thio-bis(6-tert-butyl m-cresol), 1,2-dihydro-2,2,4-trimethylquinoline (including its polymerized product), bis(2-hydroxy-3-terbutyl-5-methyl phenyl)methane, dinaphthyl p-phenylene diamine, hydroquinone, etc. The amount of inhibitor to be added to the polysiloxane is generally within the range of from 5 to 30 parts by weight, preferably 10 to 20 parts by weight per 100 parts by weight of polysiloxane.
11. compositions of polysiloxanes whose molecular weight is greater than 2,000 and lower than 100,000 and an alkali or alkaline earth metal hydroxide or oxide;
    a composition of polysiloxane and metal oxide such as calcium oxide or metal hydroxides such as potassium hydroxide, sodium hydroxide, lithium hydroxide, etc.
    The function of said metal hydroxide or oxide admixed in the forming coagent is to reduce the degree of polymerization of polysiloxane by hydrolysis. The increase in degree of polymerization of polysiloxane due to crosslinking by organic peroxide is thus balanced. Such composition can be satisfactorily utilized as a forming coagent in the present invention.
    The amount of said metal hydroxide or oxide to be added to the polysiloxane is generally within the range of from 1 to 10 parts by weight, preferably is from 3 to 7 parts by weight per 100 parts by weight of polysiloxane.

Among the above-mentioned many forming coagents, there are preferably employed polyoxyalkylene and their derivatives, random, block, or graft copolymer of two or more alkylene oxides and their derivatives, and aliphatic polyesters.

A forming coagent which is a solid or a high viscosity liquid may be used in the state of melt or a blend with a suitable liquid, for example, alkylbenzene. Such blend of course should satisfy the physical requirements for the forming coagent above-mentioned.

Suitable synthetic resins to be used in the present invention are addition polymers such as homoor copoylmers of olefines, diolefines, vinyl esters, vinyl ethers, vinyl ketones, and other vinyl or vinylidene monomers. Further examples of synthetic resins are polyamides, thermoplastic polyesters, and polyorganosiloxanes. Particularly useful are polymers such as polyethylene, ethylene propylene copolymers, ethylene-propylene-diene terpolymer, ethylene-vinyl acetate copolymer, ethylene-ethyl acrylate copolymer, styrene-butadiene copolymer, poly-cis-1, 4-isoprene, polychloroprene, polybutadiene, polydimethylsiloxane, or polyphenylmethyl/siloxane, However, any synthetic resin that can be vulcanized by an organic peroxide may be used in the present invention.

Examples of organic peroxides are dialkyl peroxide such as dimethyl peroxide, methyl ethyl peroxide, diethyl peroxide, 1,1-dihydroxy diethyl peroxide, ethyl cyclohexyl peroxide, propyl hexyl peroxide, di-tertiary butyl peroxide, di-n-butyl peroxide, tertiary butyl tertiary amyl peroxide, tertiary butyl phenyl-methyl peroxide, tertiary butyl vinyl peroxide, tertiary butyl cumyl peroxide, di-chloro-tertiary butyl peroxide, ditertiary pentyl peroxide, tertiary pentyl tertiary hexyl peroxide, di-n-hexyl peroxide, ditertiary hexyl peroxide, dicyclo hexyl peroxide, di-n-heptyl peroxide, diphenyl methyl-9-xanthenyl-peroxide, dicumyl peroxide, 1,1'-ditertiary butyl peroxyethane, 2,2-bis(tertiary butyl peroxy)butane, 1,4-bis(cumyl peroxy)butane, 1,10-bis(cumyl peroxy)decane, 2,5-dimethyl-2,5-di(tertiary butyl peroxy) hexane, 2,5-dimethyl-2,5-di(tertiary butyl peroxy)-3-hexine, 1,3-bis(tertiary butyl peroxy)dissopropyl benzene, 1,4-bis(tertiary butyl peroxy)diisopropyl benzene, etc.; hydroperoxides such as 2,5-dimethyl hexane-2,5-dihydroperoxide, 2,5-dimethylhexane-2,5-dihydroperoxide, etc.; peroxy acid and its ester such as tertiary butyl peroxy benzoate, ditertiary butyl diperoxy phthalate, 2,5-di(benzoyl peroxy)hexans, etc.

Mixtures of the above-mentioned organic peroxides may also be used in the present invention.

The above-mentioned organic peroxides may be preferably added to the vulcanizable material in a ratio of about 0.05 to 10 parts by weight per 100 parts by weight of the base synthetic resin. The vulcanizable materials to be employed in the present invention may contain various additives, such as anti-oxidants, vulcanization accelerators, vulcanization retarders, other vulcanization coagents, voltage stabilizers, plasticizers, body pigments, carbon black or colorants. Examples of the anti-oxidants which can be used are 4,4'-bis(3-methyl-6-tertiary butyl phenol), N,N'-di-2-naphthyl-p-phenylene diamine. Examples of the vulcanization accelerators are p,p'-dibenzoylquinone dioxime, tetramethyl thiuram disulfide. Examples of the vulcanization retarders are 2,6-di-tertiary butyl p-cresol, phthalic anhydride. Examples of the other vulcanization coagents are triallyl isocyanurate, diallyl phthalate. Examples of voltage stabilizers are 9,10-dibromonanthracene, diphenyl disulfide, N,N'-dialkyl copper dithiocarbamate.

The present invention can be better understood with reference to the accompanying drawings which are schematic representations of specific embodiments.

In FIG. 1, a long land die 3 connected to the crosshead 1 of an extruder with a die-holder 7 consists of die pieces 31, 32 and 33 which are connected in series by flanges, thus being capable of disassembling into separate pieces.

The flange 4, which is threaded on the end of the die piece 31, provides an annular recess 47 and an annular projection 46. Said annular recess 47 provides a step 48. A porous tube 41 is inserted into the said recess 47. The inner diameters of the die piece 31, the projection 46, and the porous tube 41 are all equal. An annular chamber 42 surrounds the porous tube 41. The chamber 42 is connected to a bore in the flange 4 and the bore 44 is connected to a pipe 43 through a connector 45.

Flange 4' of die piece 32 is hermetically connected to flange 4 using bolts 49 and nuts 50. The forming coagent is supplied to the chamber 42 through the pipe 43 and the bore 44 from a forming coagent tank (not shown) by means of high pressure pump (not shown) such as multi-plunger pump, particularly Bosch-type pump.

The chamber 42 serves as a reservoir for the forming coagent. The forming coagent which is filled in the chamber 42 oozes from the porous tube 41. The coagent spreads from the inner surface of porous tube 41 to entire inner surface of the succeeding part of the long-land die and serves to facilitate the smooth passing of a formed product through the passage of the long-land die 3. Forming coagent is supplied onto the inner surface of the die in the area of the inlet of the die land, preferably it is supplied within 1 m. from the inlet of the die land. The inlet region of the land of the long-land die is maintained at a temperature high enough to melt a vulcanisable material to be formed and low enough to avoid its premature scorching (hereinafter this region will be referred to as the forming zone). The succeeding region of the long-land die is maintained at a temperature high enough to vulcanize the material by means of band heater 6 surrounding the long-land die (hereinafter this region will be referred to as vulcanizing zone). There is no limitation in the length of the forming zone, but it is preferably less then 1 m. The forming zone may be limited to the very entrance of the land of the long-land die.

A melted vulcanizable material R is extruded by means of an extruder (not illustrated) onto an electrical conductor W which is continuously fed into a crosshead 1 through a guide piece 2, and is formed to a fixed dimension while passing through the forming zone of the long-land die. The formed layer on the electrical conductor W is heated and vulcanized while passing through the vulcanizing zone of the long-land die, and after emerging from the die, is passed into a water cooling apparatus 5 which is directly connected to the die piece 33, and water under a high pressure, for example of about 30 kg./cm.$^2$, is fed and discharged constantly toward the direction of the arrow shown in FIG. 1.

Surprisingly, when a cable insulation is immediately cooled in pressurized water after the cable emerges from the long-land die, void or bubble formation in the insulation layer was found to be negligible.

It has been recognized that a vulcanizate obtained in the steam vulcanization has many microvoids when observed under a microscope. It has also been noticed that in the conventional steam vulcanization, most commonly made at a pressure between 12–20 kg./cm.$^2$, cooling water pressure higher than about 10 kg./cm.$^2$ has little effect on the number of voids observed in the insulation.

In contrast therewith, the vulcanizate obtained according to the present invention was found to have no voids provided that the cooling is made at a pressure higher than 10 kg./cm.$^2$ All of the observations were made under a differential interference microscope to distinguish cavity voids clearly from the insulating material.

Figure 2:
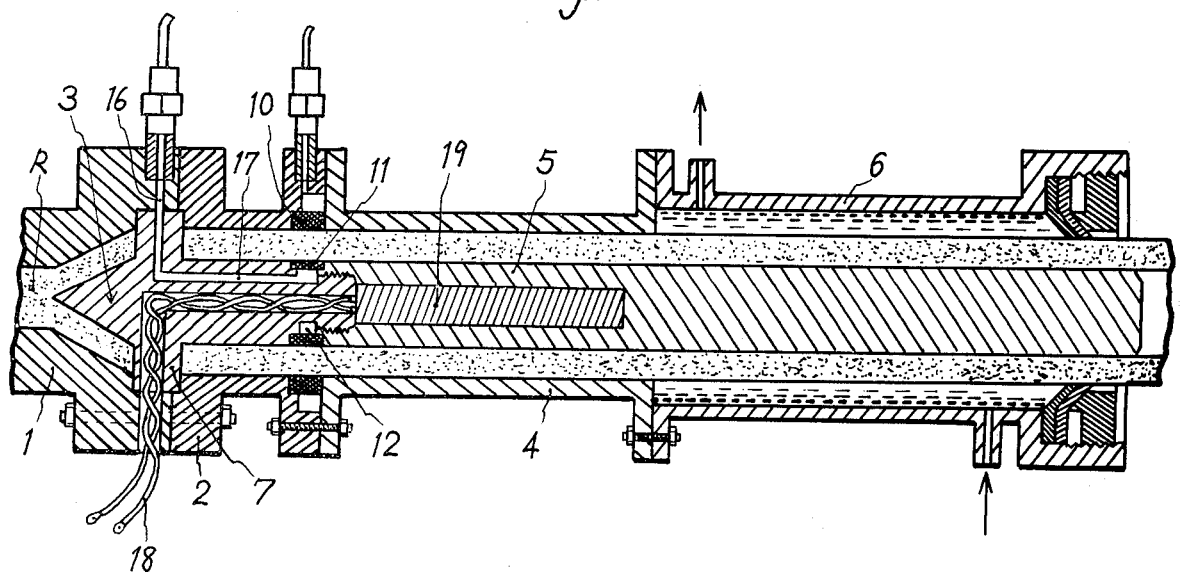
FIG. 2 is a longitudinal section view showing an apparatus for manufacturing a pipe of vulcanized polymer.

Voids-free insulation which has been thought to be the ideal for high voltage cables, is now first realized by the present invention. An apparatus for producing a cross-linked polymer pipe is illustrated in the accompanying FIG. 2. In FIG. 2, the vulcanizable material R is extruded by means of an extruder into the passage of adapter 1 and after passing through passages of struts 7 of the spider 3, is formed to a cylindrical shape in an area of the inlet of a long-land die 4. In this stage the temperature of the vulcanizable material is still below its vulcanizing temperature. The vulcanizable material thus formed is then heated and vulcanized while passing through the annular passage (vulcanizing zone) defined with the long-land die 4 and long mandrel 5. The forming coagent is supplied both onto the inner surface of the long-land die 4 through the porous tube 10 according to the same manner as explained with FIG. 1 and onto the outer surface of the mandrel 5 through the porous tube 11 which is inserted and fixed between the spider 3 and mandrel 5. Said mandrel 5 is threaded on the spider 3 and extended up to the outlet of the cooling apparatus 6. In supplying the forming coagent onto the mandrel 5, the forming coagent is supplied to the annular chamber 12 through the passage 16 and the bore 17 in the same manner as explained with FIG. 1. The mandrel 5 is heated to the vulcanizing temperature of the material by the cartridge heater 19 inserted in the mandrel 5. The cartridge heated 19 is connected with the source of electricity by lead wire 18. The vulcanized pipe, after emerging from the outlet of the long-land die 4, is cooled under pressure for example of about 10 kg./cm.$^2$ in the cooling apparatus 6 directly connected to the long-land die 4. The mandrel 5 extended to the outlet of the cooling apparatus 6 as shown in FIG. 2 serves to prevent the deformation of the pipe due to the pressure of the cooling medium. However, the mandrel 5 which only extends up to the outlet of the long-land die 4 can also be used, provided that the deformation of the vulcanized pipe by the pressurized cooling medium is permitted or there is no danger of the pipe deformation by pressurerized cooling medium. Cooling medium pressure of 5 to 50 kg./cm.$^2$, preferably 5 to 30 kg./cm.$^2$, more preferably 20 to 30 kg./cm.$^2$ is recommendable for producing a vulcanized product free from bubbles or voids. It is also preferable that the cooling apparatus 5 is constructed so as to slide easily, for example, by the use of attached wheels. With such construction, it becomes convenient to decrease and increase or to exchange die pieces, and moreover cooling apparatus itself can slide according to thermal expansion of the long-land die 3 due to temperature changes.

Obviously certain modifications and variations of the present invention as hereinbefore set forth may be made without departing from the spirit and scope thereof.

In the present invention, long-land dies of various shapes in cross-section and in dimension are optionally employed according to the cross-section and size of the desired product. It is possible for these long-land dies to be composed of two or more die pieces joined in series as illustrated in FIG. 1. As material of the long-land die, substances with good thermal conductivity such as iron, brass, copper, or aluminum are preferably employed. The long-land die may be heated by a variety of methods, for example by an electric band heated set around the die, by a hot oil jacket provided around the die, by direct introducing of electric current through the wall of the die, or by induction-heating. The long-land die is usually 1 to 20 m. long or, if necessary, longer.

The method of supplying-forming coagent onto the inner surface of the long-land die is optional, provided that the supplied forming coagent is distributed all over the inner surface of the long-land die, or at least all over the inner surface of its vulcanizing zone. The use of a porous tube as explained in FIG. 1 is believed to be the best way of supplying forming coagent; however another method may also be possible, such as supplying the forming coagent through a slit provided in the long-land die.

Supplying of the forming coagent is usually made at the forming zone of the long-land die, out, if the forming zone is extremely short, at the entrance of the long-land die. Additional supplying is also possible. For example, additional supplying can be made at a predetermined position of the vulcanizing zone. Such additional supplying is preferably made at the bottom portion of the long-land die arranged horizontally, since that portion tends to dry up.

The supplying rate of the forming coagents varies with the coagent itself, with the sizes of the formed products and forming and vulcanizing conditions, but it is usually in the range of about 0.001 to 0.04 cc. per 1 cm.$^2$ of the surface area of the formed product.

Forming and vulcanizing conditions in relation to temperature and cooling conditions in relation to the pressure of cooling medium depend upon the vulcanizable materials to be employed, for example, in case of low-density polyethylene compound containing dicumyl peroxide, the pressure of cooling medium is selected from the pressure range of about 5 to 50 kg./cm.$^2$, and the temperature of the forming zone is selected from the temperature range of about 110°to 140°C. and that of the vulcanizing zone is from about 150°to 300°C. Generally speaking, the pressure of cooling medium, the temperature of the forming zone and the temperature of the vulcanizing zone are in the range of 5 to 50 kg./cm.$^2$, 100°to 150°C. and 140°to 300°C., respectively.

In the present invention, the formed product, before passing into the vulcanizing zone, may be covered with a layer which does not contain any organic peroxide by suitable means (for example an extruder). The coated layer prevents the direct contact of the forming coagent with the organic peroxide migrating from the formed product, and hence the danger of deterioration of the forming coagent by the organic peroxide is reduced.

Polyethylene, polyethylene-base compounds and other thermoplastic resins are suitably employed as such coating materials. In producing of electrical cable having a vulcanized coating layer, such coating layer may be semi-conducting layer. The coating layers having a thickness of approximately 0.5 to 1 mm. are usually sufficient to prevent the contact of the forming coagent and the organic-peroxide.

This invention makes long-land die vulcanization practically usable for the first time, and now, vulcanized articles with good surface quality are produced more efficiently and economically. Furthermore, the present invention is most suitable for producing of insulating cable for high voltage, since vulcanized insulation formed is free from voids and bubbles.

The following Examples are given to illustrate the method of the present invention.

EXAMPLE 1

A vulcanizable polyethylene compound consisting of 100 parts by weight of low density polyethylene having a specific gravity of 0.920 and a melt index of 0.5 (ASTM D 1238-1970, Procedure A, Condition E), 2.0 parts by weight of dicumyl peroxide, 0.5 part by weight of 4,4'-thio-bis(3-methyl-6-t-butylphenol) and 0.25 part by weight of diallyl phthalate were fed into an extruder electrically heated (barrel bore: 120 mm., L/D: 14, compressing ratio: 2) and extruded on a cable core which was continuously introduced into the crosshead of the extruder at a line speed of 3.5 m./min. The cable core had a vulcanizable semiconductive polyethylene layer of 1 mm. thick on a strand (the cross-section was 600 mm.$^2$) consisting of 91 copper wires having an outer diameter of 2.9 mm.

A long-land die of 6,000 mm. in length and of 69.9 mm. in inner diameter was directly connected to the outlet of the cross-head, and the forming zone (500 mm.) was maintained at 130°C., and the vulcanizing zone residual 5,500 mm. was maintained at 250°C. A forming coagent supplying apparatus was mounted at the position of 100 mm. apart from the cross-head side end of the long-land die. Unilube 50MB-26X (Ethylene oxide-propylene oxide block-copolymer made by Nippon Oils & Fats Co., Ltd., specific gravity ($\rho$): 1.05 at 20°C., refractive index ($n_D^{20}$): 1.459, viscosity: 5.76 cst. at 235°C., boiling point: above 300°C., $\eta_1/\eta_0$: below 2, absorption ratio: -0.15 mg./cm.$^2$ (NOTE 1)) as a forming coagent, was continuously supplied through the supplying apparatus at a rate of 1.5 cc./min. (0.012 cc. per 1 cm.$^2$ of the surface area of extruded product) by the use of a high pressure plunger-type pump. The unvulcanizable polyethylene compound was extruded on the cable core and formed, while passing through the forming zone, and then heated and vulcanized, while passing through the vulcanizing zone. The vulcanized polyethylene insulated cable, after passing through the long-land die, was cooled under a high pressure cooling water of 25 kg./cm.$^2$ Thus, vulcanized polyethylene (the thickness: 18 mm.) coated cable having a glossy surface (Crade No. 1 (NOTE 2) was continuously produced for prolonged period of time longer than 500 hrs. No voids were found in any portion of the cable insulation (NOTE 3).

1. It is considered that the negative value of the absorption ratio is caused by an extraction of certain additives in the polyethylene compound into the forming coagent.
2. Surface of the vulcanized product is graded as follows: Rating No. 1: Glossy, Rating No. 2: Glossy, but a little cloudy, Rating No. 3: Not glossy, but smooth in touch, Rating No. 4: cracked fine-honeycomb.
3. Determination of number of voids in the insulation layer: A test piece cut out of the insulation layer, is cooled in liquid nitrogen for 30 min., then the piece is sliced to about 10 $\mu$ thick with a microtome. The number of voids in the slice is counted under an optical microscope (magnification of 300 times of differential interference type).

EXAMPLES 2 to 24

Forming and vulcanization of insulating materials on cable core was carried out in accordance with the present invention under the conditions shown in Table I. The number of voids in the insulation layer was determined in accordance with the method of Example 1 (NOTE 3), and no voids were found in any cable insulation obtained according to each Example. The continuous operation period and the surface grade of the insulation layer of the cable of each Example are shown in Table I.

TABLE I

| Ex. No. | a | Structure of electric cable b mm. | | | | d | Forming coagent e est. | f °C. | g | h mg./cm.$^2$ | i cc./cm.$^2$ |
|---|---|---|---|---|---|---|---|---|---|---|---|
| | | | c1 | c2 | c3 | | | | | | |
| 2 | A copper strand (91/2.9 mm., cross section: 600 mm.$^2$) covered with a vulcanized semi-conducting polyethylene layer (1 mm. thick) | 18 | LDPE ($\rho$: 0.920 MI: 0.5) | DCP 2.0 parts | 4,4'-thiobis- (3-methyl-6- t-butyl- phenol) 0.5 part Diallyl phthalate 0.25 part | Unilube 50MB- 168X | 28.00 | 300< | 2> | −0.82 | 0.01 |
| 3 | " | 18 | LDPE ($\rho$: 0.920 MI: 1.0) | TBCP 2.5 parts | 4,4'-thiobis- (3-methyl-6- t-butyl- phenol) 0.3 part p,p'-dibenzo- ylquinone dioxime 0.5 part | Plonon No. 204 | 8.96 | 300< | 2> | −1.03 | 0.011 |
| 4 | " | 18 | EVA ($\rho$: 0.93 MI: 3.5 VAc content: 14 % by weight) | TBCP 2.5 parts | 4,4'-thiobis- (3-methyl-6- t-butyl- phenol) 0.3 part p,p'-dibenzo- ylquinone dioxime 0.5 part | Plonon No. 201 | 4.42 | 300< | 2> | −1.08 | 0.015 |

| Ex. No. | j mm. | k mm. | Long-land die l l1 mm. | l2 °C. | m m1 mm. | m2 °C. | o cm./min. | p kg/cm.$^2$ | Continuous operation period hour | Surface Grade |
|---|---|---|---|---|---|---|---|---|---|---|
| 2 | 6000 | 69.9 | 500 | 130 | 5500 | 250 | 35 | 25 | 300< | 1 |
| 3 | 6000 | 69.9 | 500 | 130 | 5500 | 250 | 35 | 25 | 250< | 2 |
| 4 | 10000 | 69.9 | 500 | 125 | 9500 | 250 | 55 | 25 | 250< | 2 |

| Ex. No. | a | Structure of electric cable b mm. | c1 | c2 | c3 | d | Forming coagent e est. | f °C. | g | h mg./cm.$^2$ | i cc./cm.$^2$ |
|---|---|---|---|---|---|---|---|---|---|---|---|
| 5 | A copper strand | 18 | LDPE | BBPB | N,N'-dinaph- | Nonyl | 1.98 | 245< | 2> | 0.35 | 0.65 |

3,928,525

TABLE I-continued

| Ex. No. | Structure of electric cable | | | | | Forming coagent | | | | |
|---|---|---|---|---|---|---|---|---|---|---|
| | a | b mm. | c1 | c2 | c3 | d | e est. | f °C. | g | h mg./cm.² | i cc./cm.² |
| | (91/2.9 mm., cross section: 600 mm.²) covered with a vulcanized semi-conducting polyethylene layer (1 mm. thick) | | (ρ: 0.920 MI: 0.5) | 3.0 parts | thyl-p-phenyl-lenediamine 0.5 part p,p'-dibenzo-ylquinone dioxime 0.2 part | phenyl polyoxy-ethylene* | | | | | |
| 6 | A copper strand (37/2.6 mm., cross section: 600 mm.²) covered with a vulcanized semi-conducting polyethylene layer (1 mm. thick) | 17 | LDPE (ρ: 0.920 MI: 0.3) | TBCP 2.0 parts | Triallyl iso-cyanurate 1.0 part Phthalic anhydride 0.8 part | Oleic acid amido** | 1.17 | 350< | 2> | 0.85 | 1.65 |
| 7 | " | 17 | " | " | " | Stearic acid*** | 1.13 | 360< | 2> | 0.92 | 1.86 |
| 8 | A copper strand (19/2.6 mm., cross section: 100 mm.²) covered with a vulcanized semi-conducting polyethylene layer (1 mm. thick) | 16 | LDPE (ρ: 0.920 MI: 1.0) | BBPB 2.0 parts | Triallyl iso-cyanurate 2.0 parts 2,6-di-t-butyl-para-cresol 0.5 part | Polydi-methyl-siloxane (2000 cst. at 30°C.) 100 parts Pyrogallol 20 parts | 141 | 400< | 3.5 | 1.18 | 3.2 |

| Ex. No. | Long-land die | | | | | | o cm./min. | p kg./cm.² | Continuous operation period hour | Surface Grade |
|---|---|---|---|---|---|---|---|---|---|---|
| | j mm. | k mm. | l1 mm. | l2 °C. | m1 mm. | m2 °C. | | | | |
| 5 | 10000 | 69.9 | 500 | 125 | 9500 | 250 | 55 | 25 | 200< | 3 |
| 6 | 20000 | 54.2 | 300 | 125 | 19700 | 250 | 112 | 25 | 100< | 3 |
| 7 | 20000 | 54.2 | 300 | 125 | 19700 | 250 | 114 | 25 | 100< | 3 |
| 8 | 10000 | 47.0 | 10 | 130 | 9990 | 260 | 61 | 25 | 20< | 1 |

| Ex. No. | Structure of electric cable | | | | | Forming coagent | | | | |
|---|---|---|---|---|---|---|---|---|---|---|
| | a | b mm. | c1 | c2 | c3 | d | e est. | f °C. | g | h mg./cm.² | i cc./cm.² |
| 9 | A copper strand (19/2.6 mm., cross section: 100 mm.²) covered with a vulcanized semi-conducting polyethylene layer (1 mm. thick) | 16 | LDPE (ρ: 1.0) | DCP 2.0 parts | Triallyl iso-cyanurate 2.0 parts p,p'-dibenzo-ylquinone dioxime 0.7 part | Polydi-methyl-siloxane (2,000 est. at 30°C.) 100 parts KOH 5 parts | 132 | 400< | 3.8 | 3.56 | 6.4 |
| 10 | A copper strand (37/2.6 mm., cross section: 200 mm.²) covered with a vulcanized semi-conducting polyethylene layer (1 mm. thick) | 17 | LDPE (ρ: 0.920 MI: 0.3) | TBCP 2.5 parts | Triallyl iso-cyanurate 2.0 parts Tetramethyl-thiuram disulfide 0.7 part | Poly(1,6-hexanedi-ol adipate) | 12.8 | 270< | 2> | 0.78 | 0.32 |
| 11 | A copper strand (7/2.0 mm., cross section: 22 mm.²) covered with a vulcanized semi-conducting polyethylene layer (1 mm. thick) | 13 | " | DCP 2.5 parts | Triallyl iso-cyanurate 2.0 parts 4,4'-thiobis-(3-methyl-6-t-butyl-phenol) 0.5 part | Sorbitan mono-laurate | 2.13 | 260< | 2> | 3.62 | 1.43 |

| Ex. No. | Long-land die | | | | | | o cm./min. | p kg./cm.² | Continuous operation period hour | Surface Grade |
|---|---|---|---|---|---|---|---|---|---|---|
| | j mm. | k mm. | l1 mm. | l2 °C. | m1 mm. | m2 °C. | | | | |
| 9 | 10000 | 47.0 | 10 | 130 | 9990 | 260 | 61 | 25 | 25< | 2 |
| 10 | 3000 | 54.2 | 200 | 125 | 2800 | 270 | 28 | 22 | 100< | 2 |
| 11 | 3000 | 33.0 | 300 | 130 | 2700 | 250 | 21 | 20 | 70< | 3 |

| Ex. No. | Structure of electric cable | | | | | Forming coagent | | | | |
|---|---|---|---|---|---|---|---|---|---|---|
| | a | b mm. | c1 | c2 | c3 | d | e est. | f °C. | g | h mg./cm.² | i cc./cm.² |
| 12 | A copper strand (7/2.0 mm., cross section: 22 mm.) covered with a vulcanized semi-conducting polyethylene layer (1 mm. thick) | 13 | LDPE (ρ: 0.920 MI: 0.3) | DCP 2.5 parts | Triallyl iso-cyanurate 2.0 parts 4,4'-thiobis-(3-methyl-6-t-butyl-phenol) 0.5 part | Polyoxy-ethylene sorbitan mono-laurate | 3.62 | 270< | 2> | −0.20 | 0.32 |
| 13 | " | 13 | " | " | " | Lauryl ethanol amide | 1.26 | 260< | 2> | 1.61 | 0.69 |

TABLE I-continued

| Ex. No. | Structure of electric cable a | b mm. | c1 | c2 | c3 | d | Forming coagent e est. | f °C. | g | h mg./cm.² | i cc./cm.² |
|---|---|---|---|---|---|---|---|---|---|---|---|
| 14 | " | 13 | " | " | " | Tetra-n-octyl pyromelitate | 1.67 | 250< | 2> | 25.2 | 0.73 |
| 15 | A copper strand (19/2.6 mm., cross section: 100 mm.²) covered with a vulcanized semi-conducting polyethylene layer (1 mm. thick) | 16 | EPDM (Mitnui Petro-chemical Ind., Ltd.) | DCP 3.0 parts | Zinc white 5.0 parts Poly(2,2,4-trimethyl-1,2-dihydro-quinone 1.5 parts MT carbon 12.5 parts Chemically pretreated clay 125 parts P-200 Paraffin oil 2.0 parts Minium 5.0 parts Paraffin wax 5.0 parts | Unilube 50MB-26X | 5.73 | 300< | 2> | −0.15 | 0.012 |

| Ex. No. | Long-land die j mm. | k mm. | l1 mm. | l2 °C. | m1 mm. | m2 °C. | o cm./min. | p kg./cm.² | Continuous operation period hour | Surface Grade |
|---|---|---|---|---|---|---|---|---|---|---|
| 12 | 3000 | 33.0 | 300 | 130 | 2700 | 250 | 21 | 20 | 80< | 2 |
| 13 | 3000 | 33.0 | 300 | 130 | 2700 | 250 | 21 | 20 | 100< | 2 |
| 14 | 3000 | 33.0 | 300 | 130 | 2700 | 250 | 21 | 20 | 100< | 3 |
| 15 | 3000 | 47.0 | 200 | 130 | 2800 | 210 | 48 | 18 | 50< | 1 |

| Ex. No. | Structure of electric cable a | b mm. | c1 | c2 | c3 | d | Forming coagent e est. | f °C. | g | h mg./cm.² | i cc./cm.² |
|---|---|---|---|---|---|---|---|---|---|---|---|
| 16 | A copper strand (19/2.6 mm., cross section: 100 mm.²) covered with a vulcanized semi-conducting polyethylene layer (1 mm. thick) | 16 | SBR | DCP 3.0 parts | Zinc white 5.0 parts Poly(2,2,4-trimethyl-1,2-dihydro-quinone) 1.0 part Stearic acid 2.0 parts MT carbon 50 parts Dibenzothiazyl disulfide 1.25 parts Calcium carbonate 37.5 parts Paraffine wax 3.0 parts | Unilube 50MB-26X | 5.73 | 300< | 2> | −3.18 | 0.012 |
| 17 | A copper strand (19/2.6 mm., cross section: 100 mm.²) covered with a vulcanized semi-conducting polyethylene layer (1 mm. thick) | 16 | Poly-cis-1,4-isoprene | DCP 2.0 parts | Zinc white 3.0 parts Poly(2,2,4-trimethyl-1,2-dihydro-quinone 0.75 part Stearic acid 1.0 parts N-phenyl-N'-isopropyl-p-phenylenedi-amine 0.75 part Lead dimethyl-dithiocarbamate 0.3 part | Plonon No. 204 | 8.96 | 300< | 2> | −1.07 | 0.012 |
| 18 | " | 16 | LDPE (ρ: 0.92 MI: 1.0) | " | 4,4'-thiobis-(3-methyl-6-t-butyl-phenol) 0.5 part Diallyl phthalate 0.25 part | Mixture of Glycerine and Poly-propylene adipate (1:1) | 7.1 | 290< | 2> | 1.83 | 0.36 |

| Ex. No. | Long-land die j mm. | k mm. | l1 mm. | l2 °C | m1 mm. | m2 °C | o cm./min. | p kg./cm.² | Continuous operation period hour | Surface Grade |
|---|---|---|---|---|---|---|---|---|---|---|
| 16 | 3000 | 47.0 | 200 | 130 | 2800 | 210 | 45 | 18 | 45< | 1 |
| 17 | 3000 | 47.0 | 200 | 130 | 2800 | 210 | 47 | 18 | 45< | 2 |
| 18 | 3000 | 47.0 | 200 | 130 | 2800 | 210 | 47 | 18 | 150< | 3 |

TABLE I-continued

| Ex. No. | Structure of electric cable | | | | | d | Forming coagent | | | | |
|---|---|---|---|---|---|---|---|---|---|---|---|
| | a | b mm. | c1 | c2 | c3 | | e est. | f °C. | g | h mg./cm.² | i cc./cm² |
| 19 | A copper strand (19/2.6 mm., cross section: 100 mm.²) covered with a vulcanized semi-conducting polyethylene layer (1 mm. thick) | 16 | LDPE (ρ: 0.92 MI: 1.0) | DCP 2.0 parts | 4,4'-thiobis-(3-methyl-6-t-butyl-phenol) 0.5 part Diallyl phthalate 0.25 part | Mixture of Unilube 50MB-26X and Dioctyl sebacate (1:1) | 3.52 | 250< | 2> | 64 | 20.5 |
| 20 | " | 16 | " | " | " | Mixture of Sorbitan mono-laurate and Stearic acid (1:1) | 1.8 | 260< | 2> | 3.3 | 0.74 |
| 21 | " | 16 | " | " | " | 80% solution of Oleic acid amide in Alkylbenzene of Viscosity: 13 est. at 30°C. and $n_D^{20}$: 1.487 | 0.65 | 255< | 2> | 35.5 | 17.6 |

| Ex. No. | Long-land die | | | | | | | o cm./min. | p kg./cm.² | Continuous operation period hour | Surface Grade |
|---|---|---|---|---|---|---|---|---|---|---|---|
| | j mm. | k mm. | l | | m | | | | | | |
| | | | l1 mm. | l2 °C. | m1 mm. | m2 °C. | | | | | |
| 19 | 3000 | 47.0 | 200 | 130 | 2800 | 210 | | 47 | 18 | 25< | 2 |
| 20 | 3000 | 47.0 | 200 | 130 | 2800 | 210 | | 47 | 18 | 25< | 2 |
| 21 | 3000 | 47.0 | 200 | 130 | 2800 | 210 | | 47 | 18 | 25< | 3 |

| Ex. No. | Structure of electric cable | | | | | d | Forming coagent | | | | |
|---|---|---|---|---|---|---|---|---|---|---|---|
| | a | b mm. | c1 | c2 | c3 | | e est. | f °C. | g | h mg./cm.² | i cc./cm² |
| 22 | A copper strand (19/2.6 mm., cross section: 100 mm.²) covered with a vulcanized semi-conducting polyethylene layer (1 mm. thick) | 16 | LDPE (ρ: 0.92 MI: 1.0) | DCP 2.0 parts | 4,4'-thiobis-(3-methyl-6-t-butyl-phenol) 0.5 part Diallyl phthalate 0.25 part | 80% solution of magnesium stearate in tri-amylamine | 0.71 | 250< | 2> | 11.0 | 5.3 |
| 23 | " | 16 | " | " | " | Tri-n-butyl citrate | 0.68 | 260< | 2> | 8.31 | 4.0 |
| 24 | A copper strand (91/2.9 mm., cross section: 600 mm.²) covered with a vulcanized semi-conducting polyethylene layer (1 mm. thick) | 18 | LDPE (ρ: 0.920 MI: 0.1) | " | " | NewPol 75H-90000 | 348 | 320< | 2> | −0.08 | 0.012 |

| Ex. No. | Long-land die | | | | | | | o cm./min. | p kg./cm.² | Continuous operation period hour | Surface Grade |
|---|---|---|---|---|---|---|---|---|---|---|---|
| | j mm. | k mm. | l1 mm. | l2 °C. | m1 mm. | m2 °C. | | | | | |
| 22 | 3000 | 47.0 | 200 | 130 | 2800 | 210 | | 47 | 18 | 25< | 3 |
| 23 | 3000 | 47.0 | 200 | 130 | 2800 | 210 | | 47 | 18 | 20< | 3 |
| 24 | 6000 | 69.9 | 500 | 130 | 5500 | 250 | | 35 | 25 | 600< | 1 |

(NOTE) The symbols in Table are explained as follows:
a: Cable core
b: Thickness of insulating layer coated on the cable core (mm.)
c: Composition of vulcanizable material to be coated on the cable core
c1: Synthetic resin [ρ: specific gravity, MI: Melt Index (ASTM D 1238-1970, Procedure A, Condition E), VAc: Vinyl acetate]
c2: Organic peroxide
c3: Other additives
d: Kind
e: Viscosity ($v_o$) (est., at 235°C.)
f: Boiling point (°C.)
g: $v_1/v_o$
h: Absorption ratio at 150°C, 45 hrs. (mg./cm.²)
i: Supplying rate (cc./cm.² of the outer surface of the insulating layer)

j: Length of die land (mm.)
k: Inner diameter (mm.)
l: Forming zone
l1: Length (mm.)
l2: Temperature (°C.)
m: Vulcanizing zone
m1: Length (mm.)
m2: Temperature (°C.)
o: Feeding speed of cable core (cm./minute)
p: Cooling water pressure (kg./cm.$^2$)
LDPE: Low density polyethylene
EVE: Ethylene-vinyl acetate copolymer
EPDM: Ethylene-propylene-diene terpolymer
DCP: Dicumyl peroxide
TBCP: t-butyl cumyl peroxide
BBPB: 1,3-bis(t-butyl peroxy)diisopropyl benzene
DDTBH: 2,5-dimethyl-2,5-di(t-dutyl peroxy)-hexine-3
Unilube 50MB-26X: Ethylene oxide-propylene oxide block-copolymer made by Nippon Oils & Fats Co., Ltd. ($p$: 1.05 at 20°C., $n_D^{20}$: 1.459)
Unilube 50MB-168X: Ethylene oxide-propylene oxide block-copolymer made by Nippon Oils & Fats Co., Ltd. ($p$: 1.061 at 20°C., $n_D^{20}$: 1.462)
Plonon No. 204: Copolymer in which ethylene oxide is graft-copolymerised to polypropylene oxide, made by Nippon Oils & Fats Co., Ltd. (average molecular weight: 3,300)
Plonon No. 201: Copolymer in which ethylene oxide is graft-copolymerised to polypropolene oxide, made by Nippon Oils & Fats Co., Ltd. (average molecular weight: 2,200)
New Pol 75H-90000: Ethylene oxide-propylene oxide block-copolymer made by Sanyo Chemical Industries, Ltd. ($p$: 1.095 at 20°C., $n_D^{20}$: 1.466)
*The forming coagent blown from the die-product-interface of the die end boiled slightly, before the cooling apparatus was connected to the die end.
,*Those forming coagent were melted by maintaining the forming coagent supplying apparatuses at 100°C. and supplied.

EXAMPLE 25

A vulcanized cable was produced in the same manner as described in Example 1 except that polyoxyethylene stealyl amide was employed instead of Unilube 50MB-26X, and di-t-butyl peroxide instead of DCP. A continuous operation was attained for 60 hours.

EXAMPLE 26

An insulated cable was preduced in the same manner as described in Example II except that sorbitan was employed instead of sorbitan monolaurate. By maintaining the forming coagent supplying apparatus at 160°C. melted sorbitan was supplied. A continuous operation was attained for 60 hours with a surface of Grade No. 3.

EXAMPLE 27

An insulated cable was produced in the same manner as described in Example 14 except that dibutyl phthalate was employed instead of tetra-n-octyl pyromellitate. A continuous operation was attained for 40 hours with a surface of Grade No. 3.

EXAMPLE 28

A long-land die, 3,000 mm. long and 25.8 mm. in inner diameter was corrected to the outlet of the straight-head of a plunger-type extruder. The forming zone 300 mm. long was maintained at 150°C., and the succeeding vulcanizing zone, 2,700 mm. long was heated to 200°C. A mixture of 1.0 part by weight of 2,5-dimethyl-2,5-di(t-butyl peroxy)hexine-3, 1.0 part Table II

| Comp. Ex. No. | Structure of electric cable | | | | | d | Forming coagent | | | | |
|---|---|---|---|---|---|---|---|---|---|---|---|
| | a | b | c1 | c2 | c3 | | e est. | f °C. | g | h mg./cm.$^2$ | i cc./cm.$^2$ |
| 1 | A copper strand (19/2.0 mm., cross section: 60 mm.$^2$) covered with a vulcanized semi-conducting polyethylene layer (1 mm. thick) | 12 | LDPE ($p$: 0.920 MI: 0.5) | TBCP 3.0 parts | Triallyl iso-cyanurate 1.0 part Tetramethyl-thiuram disulfide 0.5 part | Polydi-methyl-siloxane (2,000 est. at 30°C.) | 168.5 | 400< | ∞ | 2.39 | 1.36 |
| 2 | " | 12 | " | " | " | Castor oil | 2.56 | 300< | 2> | 200 | 30.5 |
| 3 | A copper strand (19/2.0 mm., cross section: 60 mm.$^2$) covered with a vulcanized semi-conducting polyethylene layer (1 mm. thick) | 12 | LDPE ($p$: 0.920 MI: 0.5) | TBCP 3.0 parts | Triallyl iso-cyanurate 1.0 part Tetramethyl-thiuram disulfide 0.5 part | Eugenol | 0.38 | 250< | 2> | 17 | 10.8 |
| 4 | " | " | " | " | " | Water | — | 100 | 2> | −0.32 | 1.2 |
| 5 | " | " | " | " | " | Parrafin oil | 2.55 | 300< | 51 | 120 | 7.5 |
| 6 | " | " | " | " | " | Soap solution (25% aqueous solution of Soybean oil potassium soap) | — | 110 | 2> | 1.8 | 1.25 |

| Comp. Ex. No. | j mm. | k mm. | Long-land die l | | m | | o cm./min. | p kg./cm.$^2$ | Continuous operation period hour |
|---|---|---|---|---|---|---|---|---|---|
| | | | l1 mm. | l2 °C. | m1 mm. | m2 °C. | | | |
| 1 | 3000 | 36.0 | 200 | 125 | 2800 | 250 | 41 | 25 | 3 |
| 2 | 3000 | 36.0 | 200 | 125 | 2800 | 250 | 41 | 25 | — |
| 3 | 3000 | 36.0 | 200 | 125 | 2800 | 250 | 41 | 25 | — |
| 4 | " | " | " | " | " | " | " | " | — |
| 5 | " | " | " | " | " | " | " | " | — |
| 6 | " | " | " | " | " | " | " | " | — | by weight of N,N'-di-2-naphthyl-p-phenylenediamine and 100 parts by weight of high density polyethylene [$\rho$: 0.965, MI: 0.2 (ASTX D 1238-1970, Procedure A, Condition F] was fed to the said extruder to produce a vulcanized high density polyethylene rod having an outer diameter of 25.8 mm. at a speed of 33 m./min. Unilube 50XB-26X was supplied at a rate of 0.01 cc./cm.$^2$ of the outer surface of the product. A continuous operation was attained for 120 hours with a surface of Grade No. 1.

EXAMPLE 29

Using an apparatus shown in FIG. 2, a vulcanizable polyethylene compound consisting of 100 parts by weight of high density polyethylene having specific gravity of 0.96 and 2 parts by weight of dicumyl peroxide was extruded from the extruder to a long-land die 4 (5,000 mm. long). At the entrance of the die 4, Unilube 50MB-26X was supplied at a rate of 0.015 cc./cm.$^2$ of the surface of the formed product both onto the inner surface of the die 4 and onto the outer surface of the mandrel 5. While passing through the long-land die 4, the formed product was vulcanized at a temperature of 230°C. Vulcanized product was then cooled in the cooling apparatus 6 (5,000 mm. long) at a pressure of 15 kg./cm.$^2$. Excellent vulcanized polyethylene pipe whose wall thickness and outer diameter are 4 mm. and 400 mm. respectively was produced.

COMPARATIVE EXAMPLES 1 TO 6

Forming and vulcanizing of insulating materials on cable core were carried out under the condition shown in Table II. In Comparative Example 1, insulated cable with good surface quality (Grade No. 1) was obtained for 3 hours after starting of operation, but thereafter the surface of cable became gradually rough and finally cracked about 10 minutes later. Gelling film piece from the forming coagent (silicone oil) was found on the cracked furface of the produce. In Comparative Examples 2 to 6, only products with badly cracked surface were obtained.

COMPARATIVE EXAMPLE 7

Using the same vulcanizable polyethylene compound, the same size of extruder, and the same cable core as in the case of Example 1, a vulcanized polyethylene insulated cable was made using a conventional vertical steam-vulcanizer at a speed of 0.28 m./min. The length of steam vulcanizing chamber and water cooling chamber was 12 m. and 11 m., respectively. The temperature and pressure of the steam were 205°C. and 18 kg./cm.$^2$. The cable obtained had a surface of Grade No. 4. The number of voids in the insulation layer was determined in accordance with the method of Example 1 (NOTE 3), and about 100 voids of above 1 micron in diameter were found in an area of (170 × 120) sq. microns in the slice taken out of the middle layer of the cable insulation.

COMPARATIVE EXAMPLE 8

A vulcanized cable was produced by the same manner as described in Example 2 except that the forming coagent (Unilube 50MB-168X) was not supplied through a forming coagent supplying apparatus, but was admixed with the LDPE base vulcanizable material in the amount of 2.0 parts by weight per 100 parts by weight of the material. Extrusion of a vulcanized produce was however failed, because of the heavy scorching and sticking of the material on the inner surface of the long-land die.

What is claimed is:

1. A method for forming and vulcanizing a vulcanizable material comprising passing a mixture of an organic peroxide vulcanizable polymer and an organic peroxide through a long-land die having a forming zone and a succeeding vulcanizing zone maintained at a temperature of at least 140°C., while simultaneously supplying a forming coagent onto the inner surface of said long-land die, said forming coagent being characterized by
    a. a viscosity of at least 1.1 centi-strokes and at most 3,000 centi-strokes at 235°C.,
    b. an absorption ratio to the said polymer at 150°C. for 45 hours less than 30 mg./cm.$^2$,
    c. not being subject to gelation even in contact with said organic peroxide in the course of vulcanization, non-gelation being determined by a viscosity ratio of $\eta_1/\eta_0$ of less than 30, wherein $\eta_0$ is the viscosity of the forming coagent at 235°C. and $\eta_1$ is the viscosity of a mixture of 10 parts by weight of forming coagent and 1 part organic peroxide at a temperature of 235°C., and
    d. not being boiled in the course of vulcanization; the forming coagent being supplied in such a manner as to maintain a continuous film between the inner surface of said die and the polymer product.

2. A method according to claim 1, wherein the viscosity and the absorption ratio of the said forming coagent are 5 to 3,000 centi-strokes at 235°C. and less than 30 mg./cm.$^2$ at 150°C. for 45 hours, respectively.

3. A method according to claim 1, wherein the forming coagent is selected from the group consisting of
    1. polyoxyalkylenes and their derivatives, random, block or graft copolymers of at least two alkylene oxides and their derivatives whose molecular weight is greater than 120 and lower than 100,000,
    2. polyhydric alcohols (including their dehydrated products) having from 4 to 50 carbon atoms and their alkyl esters or ethers,
    3. fatty acid alcohol amides having more than 8 total carbon atoms, which are made from fatty acids having from 2 to 30 carbon atoms and alcohols having from 1 to 30 carbon atoms,
    4. fatty acid amides having from 8 to 90 carbon atoms,
    5. fatty acids having from 8 to 30 carbon atoms and their metal salts,
    6. esters of polycarboxylic acids having from 6 to 22 carbon atoms and monoalcohols having from 1 to 20 carbon atoms,
    7. phosphoric acid esters of alkyl alcohols having from 3 to 30 carbon atoms,
    8. polyesters whose molecular weight is greater than 200 and lower than 30,000,
    9. metal nitrates and metal halides,
    10. compositions of polysiloxanes whose molecular weight is greater than 2,000 and lower than 100,000 and gelation inhibitors,
    11. compositions of polysiloxanes whose molecular weight is greater than 2,000 and lower than 100,000 and a member selected from the group consisting of alkali metal hydroxide, alkali metal oxide, alkaline earth metal hydroxide and alkaline earth metal oxide; the forming coagent being supplied in such a manner as to maintain a continuous film between the inner surface of said die and the polymer product.

4. A method according to claim 1, wherein the said forming coagent is selected from the group consisting of polyoxyalkylenes and their derivatives, random, block or graft copolymers of at least two alkylene oxides and their derivatives whose molecular weight is greater than 120 and lower than 100,000 and a mixture of them.

5. A method according to claim 1, wherein said said forming coagent is compositions of polysiloxanes whose molecular weight is greater than 2,000 and lower than 100,000 and gelation inhibitors.

6. A method according to claim 1, wherein the said forming coagent is compositions of polysiloxanes whose molecular weight is greater than 2,000 and lower than 100,000 and a member selected from the group consisting of alkali metal hydroxide, alkali metal oxide, alkaline earth metal hydroxide, and alkaline earth metal oxide.

7. A method according to claim 1, wherein the said forming coagent is supplied by means of a porous tube set in the long-land die onto the inner surface of the die in the area of the inlet of the die land.

8. A method according to claim 1, wherein the said vulcanizing zone of the long-land die is maintained at a temperature between 140°C. and 300°C. and further the vulcanized product, on emerging from the die end, is cooled with pressurized water of 5 to 50 kg./cm.$^2$.

9. A method according to claim 1, wherein the said polymer is polyethylene having a Melt Index of 0.1 to 2.

10. A method for manufacturing an electric cable having a vulcanized covering which comprises
   a. extruding a melted vulcanizable material comprising an organic peroxide vulcanizable polymer and an organic peroxide onto an electrical conductor continuously,
   b. forming and vulcanizing the material by passing the material through a long-land die, having a forming zone and a succeeding vulcanizing zone maintained at a temperature of at least 140°C., at an elevated temperature and pressure while simultaneously supplying a forming coagent onto the inner surface of the said long-land die, said forming coagent being characterized by
      1. a viscosity of at least 1.1 centi-stokes and at most 3,000 centi-stokes at 235°C.,
      2. an absorption ratio to the said polymer at 150°C. for 45 hours less than 30 mg./cm.$^2$,
      3. not being subject to gelation even in contact with said organic peroxide in the course of vulcanization, non-gelation being determined by a viscosity ratio of $\eta_1/\eta_0$ of less than 30, wherein $\eta_0$ is the viscosity of the forming coagent at 235°C. and $\eta_1$ is the viscosity of a mixture of 10 parts by weight of forming coagent and 1 part organic peroxide at a temperature of 235°C., and
      4. not being boiled in the course of vulcanization, and
   c. cooling the covered conductor, on emerging from the end of the long-land die, by pressurized water of 15 to 30 kg./cm.$^2$.

11. A method according to claim 10, wherein the said polymer is polyethylene having a Melt Index of 0.1 to 2.0, the said vulcanizing zone of the long-land die maintaines at a temperature between 200°C. and 300°C., the said forming coagent is selected from the group consisting of polyoxyalkylenes and their derivatives, random, block or graft copolymers of at least two alkylene oxides and their derivatives whose molecular weight is greater than 120 and lower than 100,000 and a mixture of them.

12. A method according to claim 1, wherein the said forming coagent is supplied both onto the inner surface of the die and onto the outer surface of a mandrel set in the interior of the said long-land die and the resulting products are tubular products.

13. A method according to claim 12, wherein the said mandrel is extended into the cooling zone over the length of the die.

* * * * *